(12) United States Patent
McCarty et al.

(10) Patent No.: US 7,578,314 B2
(45) Date of Patent: Aug. 25, 2009

(54) SEAL ASSEMBLY FOR A FLUID PRESSURE CONTROL DEVICE

(75) Inventors: Michael W. McCarty, Marshalltown, IA (US); Donald R. Bush, Marshalltown, IA (US); Daniel M. Adams, Marshalltown, IA (US); Frederick W. Catron, Marshalltown, IA (US); Michael D. Frohwein, Clive, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 11/557,697

(22) Filed: Nov. 8, 2006

(65) Prior Publication Data
US 2007/0062587 A1  Mar. 22, 2007

Related U.S. Application Data

(62) Division of application No. 10/985,305, filed on Nov. 10, 2004, now abandoned.

(51) Int. Cl.
*F16K 11/06* (2006.01)
(52) U.S. Cl. .............................. 137/625.33; 137/625.37
(58) Field of Classification Search ............ 137/625.33, 137/625.34, 625.37, 625.38
See application file for complete search history.

(56) References Cited

U.S. PATENT DOCUMENTS

| | | | |
|---|---|---|---|
| 1,346,737 A | 7/1920 | Atterberry | |
| 1,708,241 A | 4/1929 | Schultheiss | |
| 1,763,486 A | 6/1930 | Strong | |
| 1,878,288 A | 9/1932 | Mohr | |
| 1,970,726 A | 8/1934 | Barrett | |
| 2,104,419 A | 1/1938 | Frye | |
| 2,117,182 A | 3/1938 | Lewis | |
| 2,172,073 A | 9/1939 | Smith | |
| 2,192,339 A | 3/1940 | Wilson | |
| 2,735,444 A | 2/1956 | Mueller et al. | |
| 3,157,200 A * | 11/1964 | Rowan | 137/625.33 |
| 3,362,680 A | 1/1968 | Weiss | |
| 3,467,357 A | 9/1969 | Schomer et al. | |

(Continued)

FOREIGN PATENT DOCUMENTS

BE  537256  3/1959

(Continued)

OTHER PUBLICATIONS

Microflat Cavitation Trim for Design DBAQ, PS Sheet 51.2:DBQ(B), Fisher Controls, Nov. 20, 1981 (two pages).

(Continued)

*Primary Examiner*—John Fox
(74) *Attorney, Agent, or Firm*—Marshall, Gerstein & Borun LLP

(57) ABSTRACT

A seal assembly for a fluid pressure control device includes a guide element having a sealing surface and a first guide surface. A throttling element assembly includes a throttling element positionable within a fluid flow path, the assembly defines a mating surface adapted to seal with the sealing surface, and a second guide surface sized to slidingly engage the first guide surface. A relief void is formed in at least one of the guide element and the throttling element assembly adjacent the first and second guide surfaces to receive loose solid material, to thereby prevent disruption of the seal formed between the sealing surface and the mating surface.

12 Claims, 4 Drawing Sheets

U.S. PATENT DOCUMENTS

| | | | |
|---|---|---|---|
| 3,635,247 A | 1/1972 | Myers | |
| 3,724,813 A | 4/1973 | Baumann | |
| 3,746,305 A | 7/1973 | Zakka et al. | |
| 3,791,224 A | 2/1974 | Sinz et al. | |
| 3,892,384 A | 7/1975 | Myers | |
| 3,901,475 A | 8/1975 | Dreibelbis | |
| 3,911,957 A * | 10/1975 | McQueen | 137/625.48 |
| 4,024,891 A * | 5/1977 | Engel et al. | 137/625.3 |
| 4,105,187 A | 8/1978 | Huber | |
| 4,208,075 A | 6/1980 | Templeton | |
| 4,397,331 A * | 8/1983 | Medlar | 137/375 |
| 4,474,208 A | 10/1984 | Looney | |
| 4,505,288 A | 3/1985 | Murphy, Jr. et al. | |
| 4,520,842 A | 6/1985 | Elliott | |
| 4,542,879 A | 9/1985 | Stein | |
| 4,573,489 A | 3/1986 | Carlton et al. | |
| 4,638,833 A | 1/1987 | Wolcott, II | |
| 4,688,755 A | 8/1987 | Pluviose et al. | |
| 4,721,284 A | 1/1988 | Bankard | |
| 4,722,507 A * | 2/1988 | Lindackers et al. | 251/80 |
| 4,790,348 A | 12/1988 | Gausman et al. | |
| 4,928,726 A | 5/1990 | Johnson et al. | |
| 5,044,604 A | 9/1991 | Topham et al. | |
| 5,141,028 A * | 8/1992 | Cohen | 137/625.3 |
| 5,236,014 A * | 8/1993 | Buls et al. | 137/625.3 |
| 5,261,453 A * | 11/1993 | Hekkert et al. | 137/625.38 |
| 5,758,682 A | 6/1998 | Cain | |
| 5,765,814 A | 6/1998 | Dvorak et al. | |
| 5,787,921 A | 8/1998 | Kryger | |
| 6,082,405 A | 7/2000 | Qvarfordh et al. | |
| 6,095,493 A | 8/2000 | Velan | |
| 6,131,612 A | 10/2000 | Beurskens et al. | |
| 6,189,862 B1 | 2/2001 | McKay et al. | |
| 6,641,112 B2 | 11/2003 | Antoff et al. | |
| 6,701,958 B2 | 3/2004 | Baumann | |
| 6,807,985 B2 * | 10/2004 | Stares et al. | 137/625.33 |
| 6,840,520 B2 * | 1/2005 | Faas et al. | 277/511 |

FOREIGN PATENT DOCUMENTS

| | | |
|---|---|---|
| CA | 448062 | 4/1948 |
| CH | 320481 | 3/1957 |
| DE | 165235 | 2/1950 |
| DE | 1098311 | 1/1961 |
| EP | 0750163 | 12/1996 |
| FR | 626830 | 9/1927 |
| GB | 232765 | 4/1925 |
| GB | 233850 | 5/1925 |
| GB | 791078 | 6/1955 |
| GB | 995720 | 3/1964 |
| GB | 2 018 397 | 10/1979 |
| GB | 2 033 549 A | 5/1980 |

OTHER PUBLICATIONS

PCT International Search Report for International Application No. PCT/US2005/036518 by the European Patent Office dated Feb. 28, 2006 (5 pages).

PCT Written Opinion of International Searching Authority for International Patent Application No. PCT/US2005/036518 dated Feb. 28, 2006 (6 pages).

* cited by examiner

SEAL ASSEMBLY FOR A FLUID PRESSURE CONTROL DEVICE

CROSS-REFERENCES TO RELATED APPLICATIONS

The present application is a divisional application of co-pending U.S. patent application Ser. No. 10/985,305, filed Nov. 10, 2004, the entire contents of which are hereby incorporated herein by reference.

FIELD OF THE DISCLOSURE

The present disclosure generally relates to fluid pressure control devices and, more particularly, to assemblies for sealing between sliding components used in such devices.

BACKGROUND OF THE DISCLOSURE

Fluid pressure control devices, such as control valves and regulators, are commonly used to control the flow characteristics of a fluid. A typical device includes a valve body defining an inlet, an outlet, and a fluid flow path extending between the inlet and the outlet. A valve seat is coupled to the valve body and defines an orifice through which the flow path travels. A throttling element, such as a plug, is moveable relative to the valve seat thereby to control fluid flow through the orifice. In a sliding-stem fluid control device, the throttling element is coupled to a stem extending outside the valve body, which in turn is coupled to an actuator for positioning the throttling element relative to the valve seat.

Sliding stem fluid control devices often require components for guiding the throttling element assembly with respect to the valve seat. In particular, it is desirable to guide the linear movement of the throttling element assembly so that it is concentric with the bonnet, packing bore, cage, seat ring, or other component coupled to the valve body. Close guiding of the stem and/or plug tip also maintains maximum lateral stability to resist vibration and fatigue failures. Accordingly, components which guide movement of the throttling element often include guide surfaces that slide against one another.

Rubbing and sliding of guide components in fluid control devices may cause material from the valve components to become free due to wear, galling, or other causes. The non-corrosive materials used for some applications are particularly susceptible to galling. Galling and other wear phenomena can cause movement and transfer of component material along the contact path. The loose material may degrade or disrupt sealed engagements within the fluid control device, such as the primary seal between a throttling element and seat, a secondary seal between a throttling element and cage, or a stem packing seal between a stem and packing assembly, to name a few.

Conventional approaches to reduce galling typically employ the use of dissimilar materials for the components which contact one another. This practice can result in higher cost materials and assembly, and may limit use of the device in certain applications.

DETAILED DESCRIPTION OF THE PREFERRED EMBODIMENTS

A seal assembly for a fluid control device is disclosed which includes a relief void for reducing the deleterious affects of galling or other wear damage to sealed contact areas within the device. The relief void provides a space into which material, typically metal material, from components in contact may collect, thereby preventing the material from entering areas intended for sealed contact. For example, the relief void may be positioned adjacent the sealed contact area between a plug and valve seat, between a plug and cage, or between a stem and packing assembly. While these exemplary embodiments are described in greater detail below, it will be appreciated that the relief void may be located in other areas within a fluid control device that would benefit from the benefits taught herein.

Figure 1:
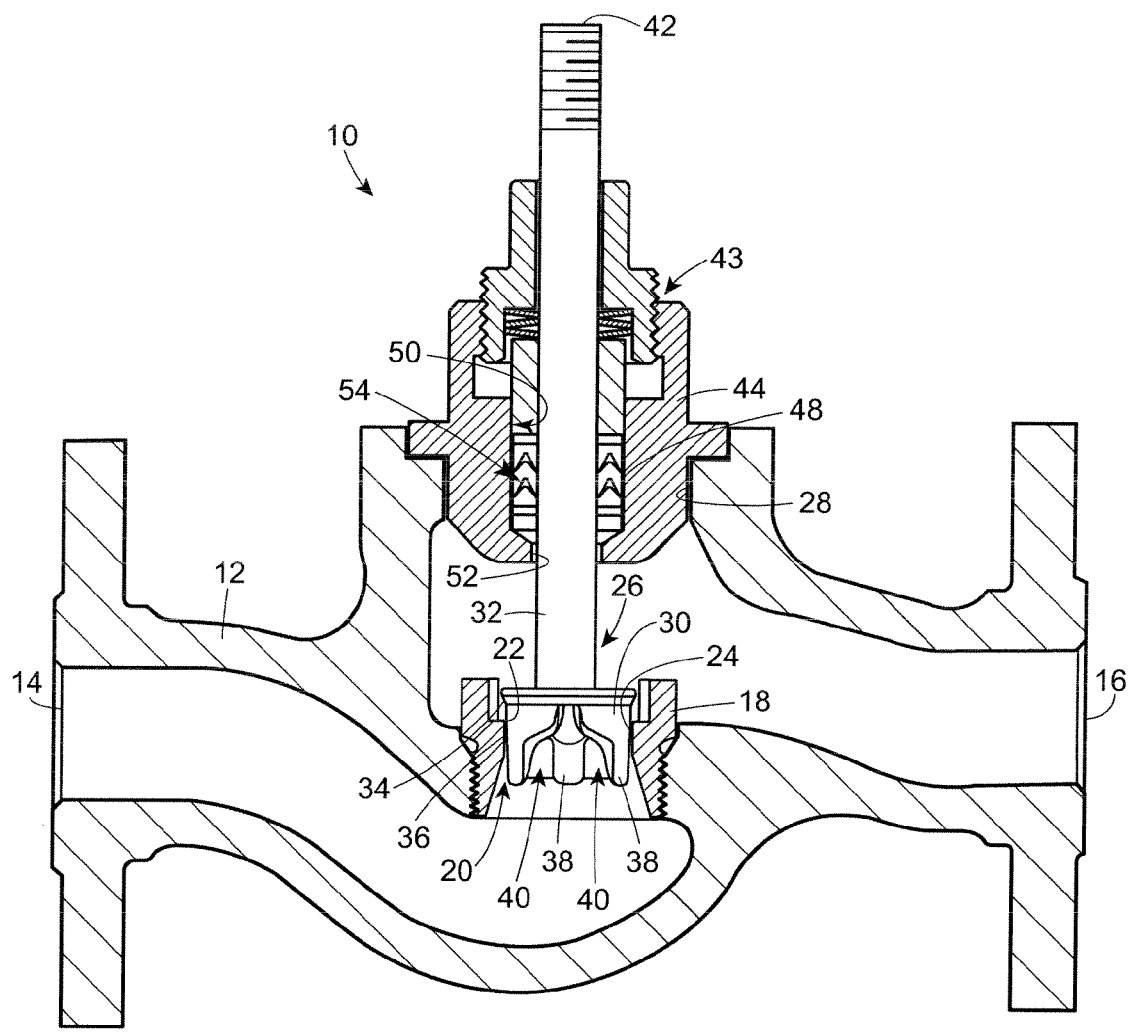
FIG. 1 is a side elevation view, in cross-section, of a fluid control device having a relief void positioned adjacent the contact surface between a plug and seat.
Figure 2:
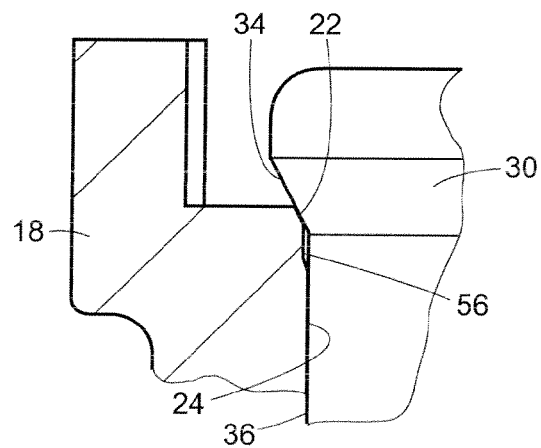
FIG. 2 is an enlarged view of a detail of FIG. 1 illustrating the relief void.

FIGS. 1 and 2 illustrate a sliding-stem, single port, unbalanced plug control valve 10 having a valve body 12 defining an inlet 14 and an outlet 16, wherein the valve 10 controls fluid flow from the inlet 14 to the outlet 16. A valve seat 18 is coupled to the valve body 12 and defines an orifice 20 through which the flow path passes. In the illustrated embodiment, the valve seat 18 is coupled to the valve body 12 by a threaded engagement, however other known coupling methods may be used. An upper portion of the valve seat 18 is formed with a sealing surface 22, which has a frustoconical shape in the exemplary embodiment. A lower portion of the valve seat 18 is formed with a cylindrical interior surface 24.

A throttling element assembly 26 is inserted through a top port 28 of the valve body to control fluid flow through the valve seat orifice 20. The throttling element assembly 26 includes a throttling element, such as plug 30, coupled to a stem 32. The plug 30 includes a mating surface 34 that is shaped to complement the valve seat sealing surface 22, so that the mating surface 34 sealingly engages the sealing surface 22 to form a primary seal when the plug 30 is in the closed position, as illustrated in the FIG. 2. The plug 30 also includes a cylindrical exterior surface 36 sized to slidingly engage the valve seat interior surface 24. In this embodiment, the interior surface 24 of the valve seat 18 and the exterior surface 36 of the plug 30 provide first and second guide surfaces which direct the plug mating surface 34 toward the valve seat sealing surface 22 as the throttling element assembly 26 moves to the closed position.

In the embodiment illustrated in FIG. 1, the plug 30 further includes flow characterizing legs 38 extending downwardly from the exterior surface 36. The legs 38 are shaped to form gaps 40 therebetween, thereby to obtain desired flow characteristics when the throttling element assembly 26 is only partially open, as is well known in the art. It will be appreciated that other types of plugs, with and without flow characterizing legs, may be used without departing from the scope of the present disclosure.

The stem 32 extends from a top surface of the plug 30 and through the valve body top port 28. A free end 42 of the stem 32 is adapted for coupling to an actuator (not shown) which provides a motive force to the throttling element assembly 26.

A bonnet assembly 43 is coupled to the valve body 12 to enclose the top port 28 and to seal with the stem 32. The bonnet assembly 43 includes a bonnet 44 releasably coupled to the body 12, such as by fasteners. The bonnet 44 has an inner bore 48 defining a packing chamber 50 and a neck 52. The neck 52 may slidingly engage the stem 32 to provide additional guidance to the throttling element assembly 26 during movement, as discussed in greater detail below with reference to the embodiment of FIG. 5. A packing assembly 54 may be inserted into the packing chamber 50 to seal between the valve stem 32 and the bonnet inner bore 48 to prevent leakage of fluid therethrough.

A relief void 56 is formed in the valve seat 18 to reduce the risk of freed material, such as from galling, from entering the primary seal area. As illustrated in FIGS. 1 and 2, the relief void 56 is formed as a generally annular groove which creates a gap between the plug exterior surface 36 and the valve seat interior surface 24. The void 56 has a volume sufficient to receive material from the plug 30, the valve seat 18, or other component that may be loosened or otherwise transferred during operation of the throttling element assembly 26.

In the exemplary embodiment the relief void 56 is positioned between the primary seal formed by the sealing surface 22 and mating surface 34 and the guide surfaces provided by the plug exterior surface 36 and the valve seat interior surface 24. Accordingly, material freed by galling, wear, or other causes, which will typically originate in the area of the guide surfaces, will collect in the relief void 56, thereby avoiding disruption of the primary seal. Material deposited in the relief void 56 may be subsequently removed by process fluid flow or may remain in the relief void indefinitely. While the exemplary embodiment shows the relief void 56 positioned immediately adjacent the primary seal, it will be appreciated that the relief void 56 may have other locations, as long as it is proximate either the guide surfaces or the sealing surfaces. Furthermore, while the relief void 56 is shown as formed in the valve seat 18, it may additionally or alternatively be provided in the plug 30. Accordingly, the same or similar materials may be used for the valve seat 18 and plug 30, such as 316 Stainless Steel, 304L Stainless Steel, Stainless Steel Alloy 20, or the like.

Figure 3:
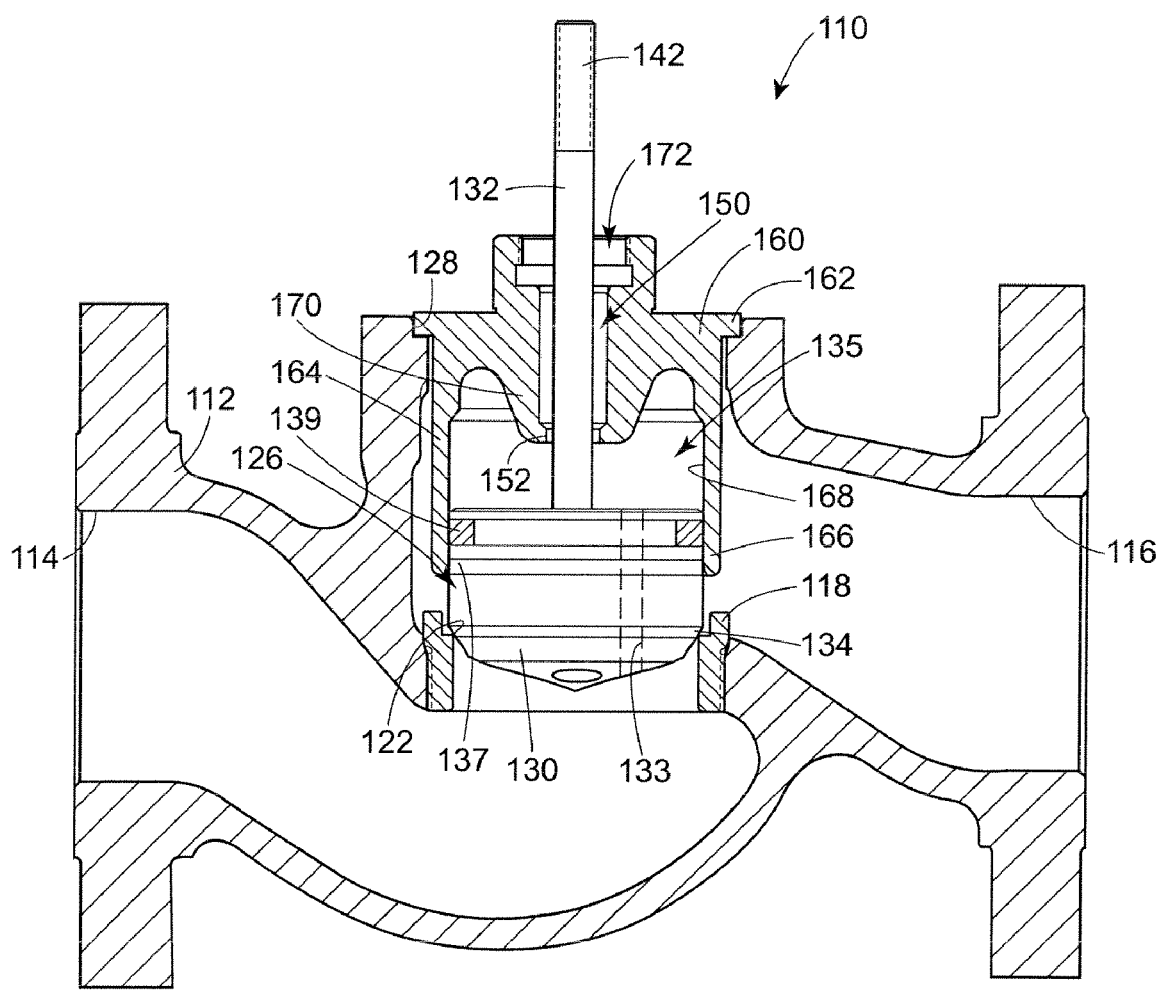
FIG. 3 is a side elevation view, in cross-section, of a second embodiment of a fluid control device having a relief void positioned between a plug and cage.
Figure 4:
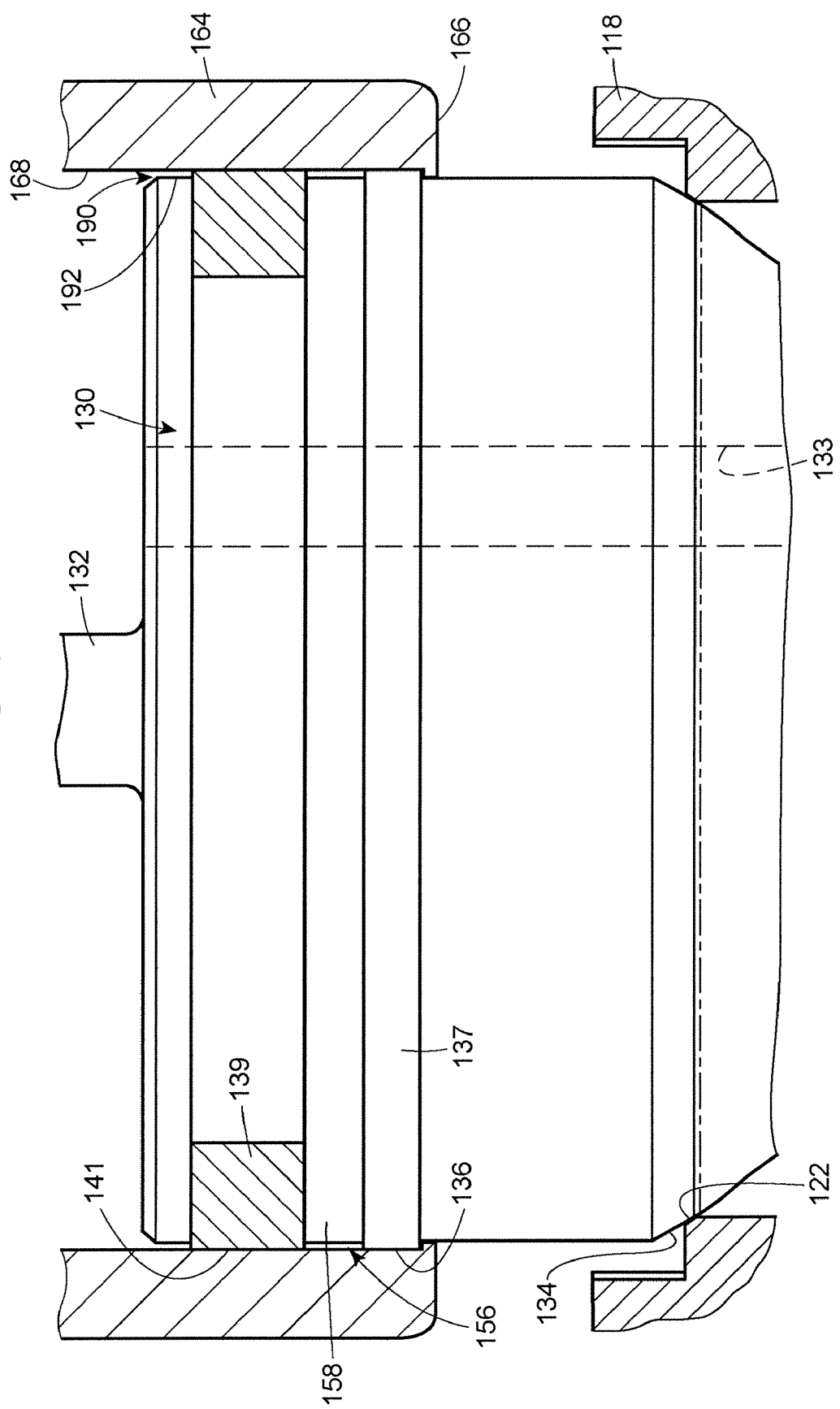
FIG. 4 is an enlarged view of a detail of FIG. 3 illustrating the relief void.

FIGS. 3 and 4 illustrate an alternative embodiment of the seal assembly incorporated into a valve 110 having a cage-style trim and balanced valve plug. The valve 110 includes a valve body 112 defining an inlet 114 and an outlet 116, wherein the valve controls fluid flow from the inlet 114 to the outlet 116. A valve seat 118 is coupled to the body 112 and defines an orifice 120 through which the flow path passes. Again, while the valve seat 118 is illustrated as being coupled to the valve body 112 by a threaded engagement, other known types of couplings may be used. The valve seat 118 includes a sealing surface 122.

A throttling element assembly 126 and a cage 160 are inserted through a top port 128 of the valve body 112 to control fluid flow through the valve seat orifice 120. The cage 160 includes a flange 162 that is coupled to and substantially closes off the body top port 128. A cylindrical wall 164 extends downwardly from the flange 162 and has a bottom edge 166 that is spaced from the valve seat 118 when assembled, thereby to allow fluid flow therebetween. The cylindrical wall 164 further defines an interior surface 168. The cage 160 also includes a boss 170 having a center bore 172 formed therein. The center bore 172 is substantially concentric with the interior surface 168 and defines a packing chamber 150 and a neck 152.

The throttling element assembly 126 includes a throttling element moveable within the fluid flow path. The throttling element, such as a plug 130 and through the valve body top portion 128. A free end 142 of the stem 132 is adapted for coupling to an actuator (not shown) which provides a motive force to the throttling element assembly 126. A bottom portion of the plug 130 includes a mating surface 134 that is shaped to complement the valve seat sealing surface 122, so that the mating surface 134 sealingly engages the sealing surface 122 to form a primary seal when the plug 130 is in the closed position. The plug 130 also includes a balance port 133 which allows fluid to flow into an upper chamber 135 defined by the cage 160 and an upper surface of the plug 130.

The plug 130 includes a guide ring 137 defining an exterior surface 136 sized to slidingly engage the cage interior surface 168. In this embodiment, both the guide ring 137 and the cage interior surface 168 are cylindrical to provide first and second guide surfaces adapted to direct the plug mating surface 134 toward the valve seat sealing surface 122 as the throttling element assembly 126 moves the closed position.

The plug 130 also includes a seal ring 139 for preventing fluid leakage through a secondary flow path between the cage 160 and plug 130. The seal ring 139 is also generally cylindrical and defines a second mating surface 141 sized to slidingly engage and seal with the cage interior surface 168. The seal ring 139 may be formed of a material that adequately seals with the metal cage material while allowing sliding along the cage interior surface 168. Possible materials include a fluoropolymer resin, such as the TEFLON® product marketed by DuPont, a graphite material or nitrile rubber.

A first relief void 156 is formed in the plug 130 to reduce the risk free material from entering the secondary seal area of contact between the seal ring 139 and the cage interior surface 168. As best illustrated in FIG. 4, the relief void 156 is formed by an intermediate recessed portion 158 of the plug 130. The intermediate recessed portion 158 creates a generally annular groove having a volume sufficient to receive material from either the plug 130, the cage 160, or other valve components that may be loosened or otherwise transferred during operation of the throttling element assembly 126. In the illustrated embodiment, the first relief void 156 is positioned between the guide ring and the seal ring, however the alternative locations noted above with respect to the embodiment of FIGS. 1 and 2 may also be used.

To further protect the sealed contact between the seal ring 139 and the cage interior surface 168, a second relief void 190 may also be provided. As illustrated in FIGS. 3 and 4, the second relief void 190 is formed by a top portion 192 of the plug 130 having a reduced diameter. As with the first relief void 156, the second relief void 190 creates a gap between the plug 130 and the cage interior surface 168 which may receive material freed by galling, wear, or other causes.

Figure 5:
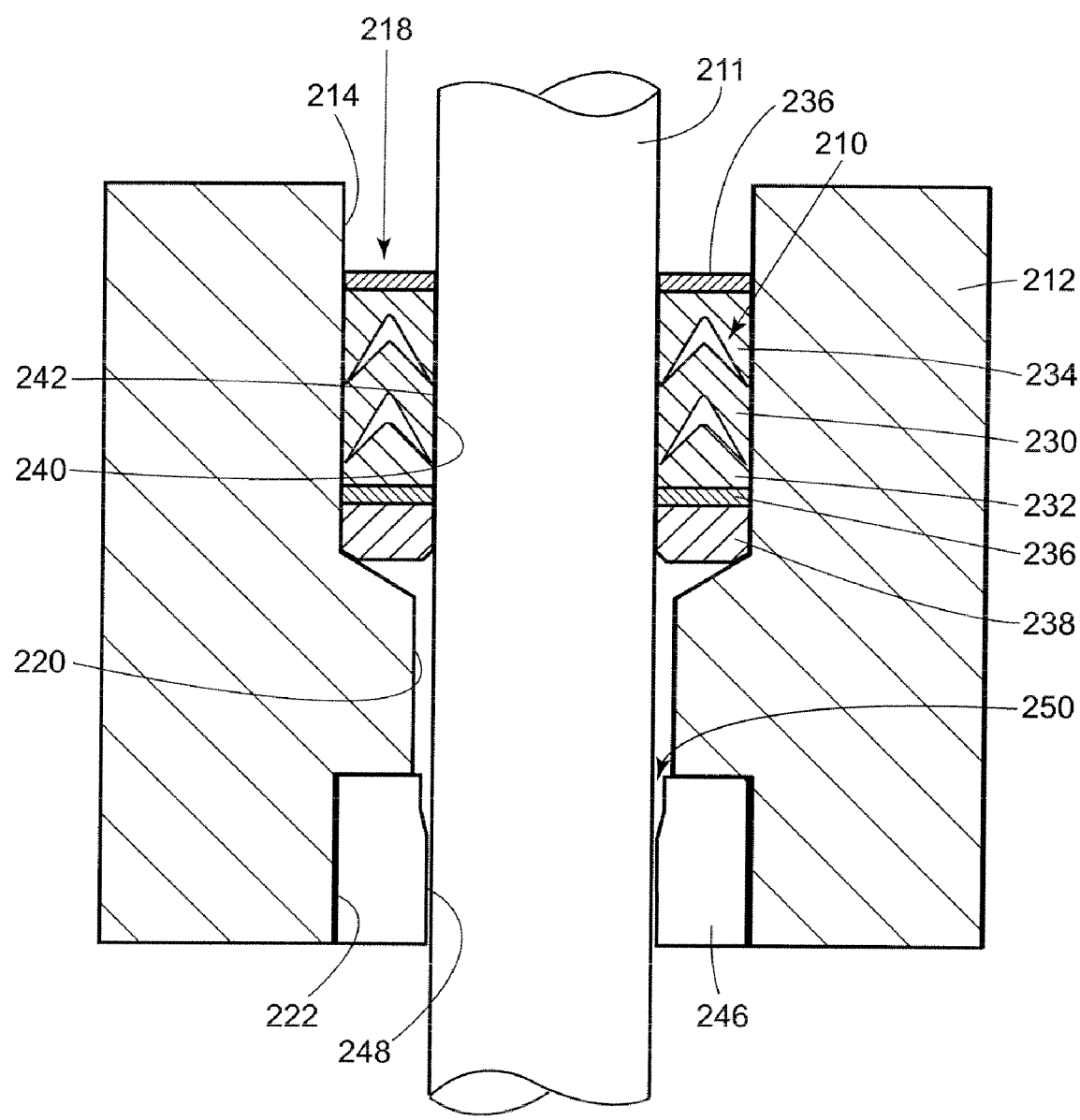
FIG. 5 is a side elevation view, in cross-section, of a further embodiment of a fluid control device having a relief void positioned adjacent the stem and packing assembly.

An additional embodiment of a seal assembly for use in a fluid control device is illustrated in FIG. 5, which shows an enlarged elevation view, in cross-section, of a sealed contact between a packing assembly 210 and a stem 211. The stem 211 is part of a throttling element assembly including a throttling element (not shown). A bonnet 212, which may be coupled to a valve body (not shown), includes a center bore 214 sized to receive the valve stem 211. The center bore 214 defines a packing chamber 218, a neck 220, and a receptacle 222. The packing assembly 210 may be inserted into the packing chamber 218 to seal between the valve stem 211 and the inner bore 214, thereby to prevent leakage of fluid therebetween.

The illustrated packing assembly 210 includes a V-ring 230, a male adaptor 232, a female adaptor 234, upper and lower anti-extrusion rings 236, and a packing box ring 238, however, other known packing box components may be used without departing from the present disclosure. In operation, the packing assembly 210 is compressed so that an interior mating surface 240 of the V ring 230 sealingly engages an exterior sealing surface 242 of the stem 211. Material for the V ring 230 is selected so that it provides a good seal with the stem while allowing the stem to slide.

A bearing ring 246 is inserted into the receptacle 222 for further guiding the stem 211 during travel. As such, the bearing ring 246 includes an interior surface 248 that closely fits an exterior surface of the stem 211, yet allows the stem to slide. Accordingly, the interior surface 248 and stem exterior surface provide guide surfaces for directing sliding movement of the throttling element assembly.

A relief void 250 is formed adjacent the interior surface 248 for receiving loosened material, thereby reducing the risk of degrading the packing assembly/stem seal. The relief void 250 is formed as an enlarged diameter portion of the interior surface 248, which creates an annular groove. The groove defines a gap between the bearing ring interior surface 248 and the stem exterior surface having a volume sufficient to receive valve material loosened during operation. In this embodiment, the relief void 250 is positioned immediately adjacent the guiding surfaces defined by the bearing ring interior surface 248 and the stem exterior surface, which are slightly spaced from the sealed contact between the packing assembly and stem.

The foregoing detailed description has been given for clearness and understanding only, and no unnecessary limitations should be understood therefrom, as modifications would be obvious to those skilled in the art.

We claim:

1. A fluid pressure control device comprising:
   a body defining an inlet, an outlet, and a fluid flow path extending from the inlet to the outlet;
   a guide element coupled to the body and comprising a metal cage having an interior surface defining a sealing surface and a first guide surface;
   a plug assembly comprising a metal plug positionable within the flow path and coupled to a stem, the plug assembly defining a mating surface and a second guide surface, the plug assembly moveable between a closed position wherein the mating surface engages and seals with the sealing surface of the guide element, and an open position wherein the mating surface is displaced away from the sealing surface of the guide element, the second guide surface of the plug assembly carried by a metal guide ring in metal-to-metal sliding engagement with the first guide surface of the metal cage;
   a seal ring providing a cylindrical sealing surface on the exterior of the plug assembly, the cylindrical sealing surface continuously sealingly engaging the first guide surface of the guide element; and
   a relief void extending from the metal plug to the first guide surface of the metal cage, and extending from the guide ring to the seal ring, the relief void being enclosed and of constant volume throughout a range of travel of the plug assembly from the open position to the closed position.

2. The fluid pressure control device of claim 1, wherein at least a portion of the relief void is defined by a first recessed portion formed in the plug.

3. The fluid pressure control device of claim 2, wherein the first recessed portion of the plug is positioned adjacent the seal ring.

4. The fluid pressure control device of claim 3, further comprising a second relief void defined by a second recessed portion formed in the plug, the second recessed portion of the plug formed opposite the seal ring from the first recessed portion of the plug.

5. The fluid pressure control device of claim 4, wherein the second relief void having a first end that is sealed closed by the continuous engagement between the seal ring and the guide element, and a second end that is open.

6. The fluid pressure control device of claim 1, wherein the seal ring is removably coupled to the plug.

7. A seal assembly for a fluid pressure control device having a body defining an inlet, an outlet, and a fluid flow path extending from the inlet to the outlet, the seal assembly comprising:
   a guide element coupled to the body and comprising a metal cage having an interior surface defining a sealing surface and a first guide surface;
   a throttling element assembly including a metal plug positionable within the flow path, the throttling element assembly defining a mating surface and a second guide surface, the throttling element assembly moveable between a closed position wherein the mating surface engages and seals with the guide element sealing surface, and an open position wherein the mating surface is displaced away from the sealing surface, the second guide surface of the throttling element assembly comprising a metal guide ring in metal-to-metal sliding engagement with the first guide surface of the metal cage;
   a seal ring providing a cylindrical sealing surface on the exterior of the throttling element assembly, the cylindrical sealing surface continuously sealingly engaging the first guide surface of the guide element; and
   a relief void extending from the metal plug to the first guide surface of the metal cage, and extending from the guide ring to the seal ring, the relief void being enclosed and of constant volume throughout a range of travel of the plug assembly from the open position to the closed position.

8. The seal assembly of claim 7, wherein a first recessed portion of the plug forms at least a portion of the relief void.

9. The seal assembly of claim 7, wherein the first recessed portion of the plug is positioned adjacent the seal ring.

10. The seal assembly of claim 9, further comprising a second relief void formed by a second recessed portion of the plug, the second recessed portion of the plug formed opposite the seal ring from the first recessed portion of the plug.

11. The fluid pressure control device of claim 10, wherein the second relief void having a first end that is sealed closed by the continuous engagement between the seal ring and the guide element, and a second end that is open.

12. The fluid pressure control device of claim 7, wherein the seal ring is removably coupled to the plug.

* * * * *

UNITED STATES PATENT AND TRADEMARK OFFICE
CERTIFICATE OF CORRECTION

PATENT NO. : 7,578,314 B2  Page 1 of 1
APPLICATION NO. : 11/557697
DATED : August 25, 2009
INVENTOR(S) : Michael W. McCarty et al.

It is certified that error appears in the above-identified patent and that said Letters Patent is hereby corrected as shown below:

Title Page:

Item (57), line 2, "scaling" should be -- sealing --.

In the Specification:

At Column 4, line 1, "130 and through" should be -- 130, is coupled to a stem 132 which extends from a top surface of the plug 130 and through --.

Signed and Sealed this

Seventeenth Day of August, 2010

David J. Kappos
*Director of the United States Patent and Trademark Office*